United States Patent [19]

Takeuchi

[11] Patent Number: 4,865,174
[45] Date of Patent: Sep. 12, 1989

[54] COOLING MECHANISM OF PULL-TYPE CLUTCH

[75] Inventor: Hiroshi Takeuchi, Higashiosaka, Japan

[73] Assignee: Kabushiki Kaisha Daikin Seisakusho, Osaka, Japan

[21] Appl. No.: 155,933
[22] PCT Filed: May 22, 1987
[86] PCT No.: PCT/JP87/00329
  § 371 Date: Jan. 7, 1988
  § 102(e) Date: Jan. 7, 1988
[87] PCT Pub. No.: WO87/07346
  PCT Pub. Date: Dec. 3, 1987

[30] Foreign Application Priority Data

May 26, 1986 [JP] Japan .................. 61-120799

[51] Int. Cl.⁴ .......................... F16D 13/72
[52] U.S. Cl. .............. 192/70.12; 192/109 R; 192/113 A
[58] Field of Search ........... 192/70.12, 113 A, 109 R

[56] References Cited

U.S. PATENT DOCUMENTS 4,657,128 4/1987 Fujito et al. ............ 192/113 A

FOREIGN PATENT DOCUMENTS 2906863 9/1980 Fed. Rep. of Germany .... 192/89 B
3703663 8/1987 Fed. Rep. of Germany ... 192/113 A
2181193 4/1987 United Kingdom ......... 192/113 A Primary Examiner—Leslie A. Braun
Assistant Examiner—Andrea Pitts
Attorney, Agent, or Firm—Armstrong, Nikaido, Marmelstein, Kubovcik & Murray

[57] ABSTRACT

A cooling mechanism of a pull-type clutch wherein an outer peripheral edge of an opposite-to-flywheel-side face of an outer peripheral annular portion is supported by a clutch cover through a wire ring, an inner peripheral edge of a flywheel-side face thereof is supported by a fulcrum projection of a pressure plate, an annular holder covering the opposite-to-flywheel-side of the outer peripheral annular portion is installed by utilizing window holes of a diaphragm spring having slits which extend toward a central axis from plural places of an inner peripheral edge of the outer peripheral annular portion through the window holes, leg pieces are provided which extend from an inner peripheral edge of the annular holder through said window holes toward the flywheel side to be secured to a pressure plate, blade pieces are provided which extend from the holder inner peripheral edge toward the remaining part of the window holes and force air into the window holes during rotation, and a stopper is provided which extends from an outer peripheral edge of the holder toward a diaphragm spring side in order for limiting a movement of the pressure plate to the flywheel side.

5 Claims, 1 Drawing Sheet

COOLING MECHANISM OF PULL-TYPE CLUTCH

TECHNICAL FIELD

This invention relates to a cooling mechanism of a pull-type clutch applicable to automobiles and other vehicles.

BACKGROUND OF THE INVENTION

Generally, in a clutch for automobile etc., a facing at an outer periphery of an output side clutch disc is pressed or released by and between a flywheel receiving an engine torque and a pressure plate, so that an engine power is transmitted or cut off therebetween. Consequently, temperature rise occurs in the pressure plate and the facing to cause a deformation of a friction surface of the pressure plate, and an early wear and a fade phenomenon etc. of the facing. To cope with these troubles, various cooling mechanisms supplying cooling air to friction elements of the pressure plate and the facing from outside of the clutch cover have been proposed. In these mechanisms, however, the pressure plate is cooled by induced air so that a relative velocity with outside air utilizing a rotation of clutch can not be utilized positively to cause an insufficiency in cooling. Further, when a diaphragm spring is used for the pull-type clutch, a stud pin for supporting the diaphragm spring to a clutch cover becomes disused so that a separate locking mechanism for the diaphragm spring is required. Moreover, when a clutch cover assembly including no clutch disc is transported for delivery from a clutch manufacturer to an automobile manufacturer or stored therein as a stock in a position where the pressure plate is hung downward, the pressure plate will swung due to its weight or vibration so that a strap plate connecting the pressure plate to the clutch cover will be excessively bent or deformed in an extreme case. For this reason, separate clamping members (such as spacers, bolts etc.) for clamping the pressure plate have conventionally been assembled thereto for avoiding the foregoing troubles during transportation or storing of a unit of the clutch assembly. However, this method has required additional labors in removing the clamping members from the pressure plate when it is assembled to an automobile and in previously attaching the clamping members to the pressure plate.

DISCLOSURE OF THE INVENTION

An object of this invention is to let holder fastened to a pressure plate have functions of a cooling fin and a blade for inducing cooling air flow in order to obtain a positive cooling effect by taking advantage of a fact that window holes (conventional stud pin holes) of a diaphragm spring become disused in the pull-type clutch, to let it serve also as a locking mechanism for the diaphragm spring, and further to let it have a function of a clamping member for preventing the pressure plate from swinging during transportation and storing of a unit of a clutch assembly.

In a pull-type clutch having a clutch cover fastened to a flywheel, a diaphragm spring an outer peripheral portion of which is supported to a flywheel side of an inner peripheral portion of the clutch cover through a wire ring, a pressure plate supporting a flywheel side inner peripheral edge of an outer peripheral annular portion of the diaphragm spring, a strap plate connecting the pressure plate with the clutch cover, and a clutch disc disposed between the pressure plate and the flywheel, the clutch disc being released by pulling in an opposite-to-flywheel-direction tip ends of release levers positioned between slits extending to a central axis side from plural window holes arranged at an internal side of said outer peripheral annular portion; the present invention relates to a cooling mechanism of the pull-type clutch having an annular holder which covers an opposite-to-flywheel side of said outer peripheral annular portion, a leg piece which extends from a holder inner peripheral edge through a part of said window holes to the flywheel side to be secured to the pressure plate, a blade piece which extends from the holder inner peripheral edge to the remaining part of the window holes to force air into the window holes during rotation, and a stopper which extends from a holder outer peripheral edge to a side of the diaphragm spring in order for limitting a movement of the pressure plate toward the flywheel side when the clutch disc is not attached.

Figure 1:
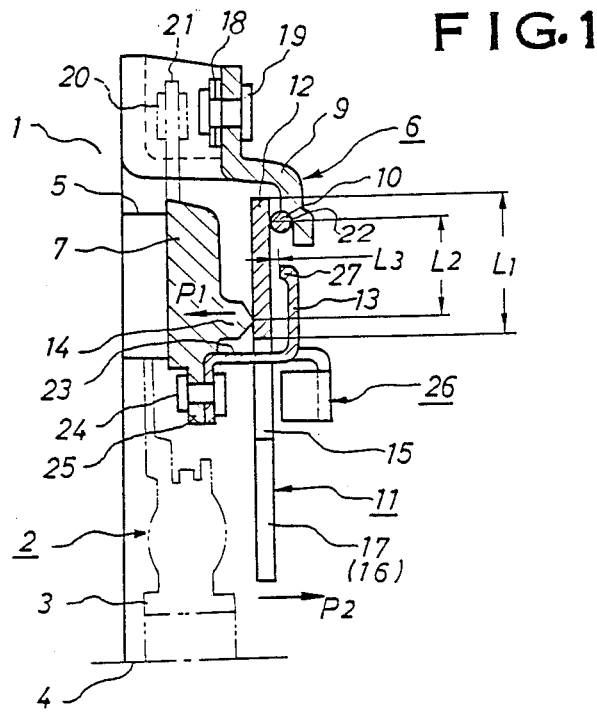
FIG. 1 is a vertical sectional view of a cooling mechanism according to the invention.

BEST MODE FOR CARRYING OUT THE INVENTION 1 in FIG. 1 represents a flywheel which is directly coupled to a crank shaft (not shown) of an engine. 2 represents an output side clutch disc, a central spline hub 3 spline fits onto an output shaft (with a center axis 4) serving also as an input shaft of a succeeding transmission. A front face (left end face of the figure) of an outer peripheral facing 5 faces on the flywheel 1 and a rear face thereof faces on a pressure plate 7 in a clutch cover assembly 6, and the facing 5 is so constructed as to be pressed by the pressure plate 7 on the flywheel 1 at the time of engaging the clutch and released from the flywheel 1 at the time of disengaging the clutch.

Figure 2:
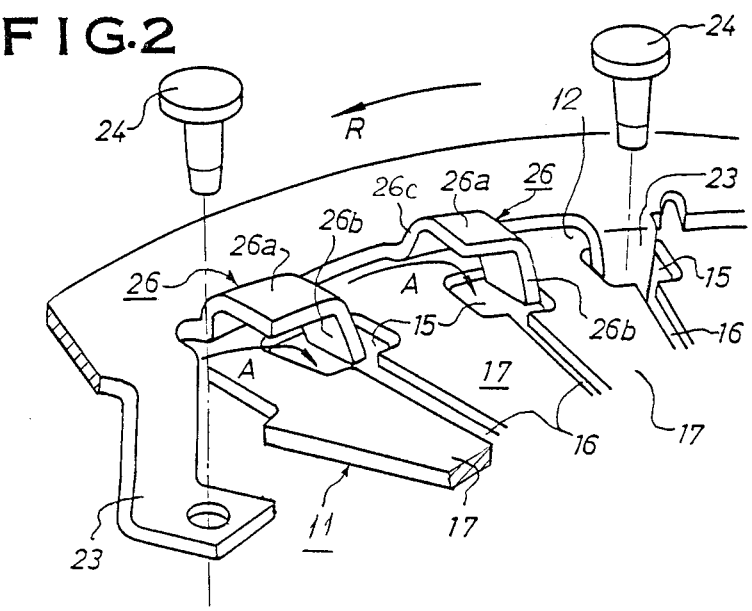
FIG. 2 is a partial perspective view.

The clutch cover assembly 6 is composed of a clutch cover 9 fastened to the flywheel 1, a diaphragm spring 11 an outer peripheral portion of which is supported through a wire ring 10 fitted in an annular stepped part 22 of the flywheel 1 side at an inner peripheral portion of the clutch cover 9, said pressure plate 7 supporting a flywheel 1 side inner peripheral edge of an outer peripheral annular portion 12 of the diaphragm spring 11, a strap plate 18 connecting the pressure plate 7 and the clutch cover 9, and an annular holder 13 (air foil plate) newly employed in the present invention. A radial width of the outer peripheral annular portion 12 of the diaphragm spring 11 is L1, and the annular portion is supported by the wire ring 10 and a fulcrum projection 14 of the pressure plate 7 in a width of L2 therebetween. A plurality of window holes 15 are disposed at an inside portion of the outer peripheral annular portion 12 on the same circumference with equal intervals left therebetween. Slits 16 extend in radially inward direction from each window hole 15, and a release lever 17 as shown in FIG. 2 is formed between neighboring slits 16, 16. The diaphragm spring 11 applies a spring load P1 on the pressure plate 7 from the outer peripheral annular portion 12 through a fulcrum 14 so that the facing 5 presses on the flywheel 1 to keep an engaged state of the clutch. In order to disengage the clutch, a release load P2 is applied on a tip end of the release lever 17 through a release bearing (not shown) to cause a spring backing of the outer peripheral annular portion 12 with the wire ring 10 used as a fulcrum point, thus the facing is released.

One end of the strap plate 18 is secured by a rivet 19 to the clutch cover 9 and extends in a direction opposite to rotating direction of the clutch (normal to the plane of FIG. 1), and the other end thereof is secured by another rivet 20 to an outer peripheral projection 21 of the pressure plate 7 and always urges the pressure plate 7 so as to slightly separate it from the flywheel 1.

The annular holder 13 newly employed in accordance with the present invention covers a surface opposite to the flywheel 1 of the outer peripheral annular portion 12 of the diaphragm spring 11 with a slight gap left therebetween, a strip leg piece 23 extends from its inner peripheral edge to the flywheel 1 side through a part of the window holes 15, and a tip end of the leg piece 23 is bent rectangularly to be secured by a rivet 24 to an inner peripheral projection 25 of the pressure plate 7. A blade piece 26 extends toward the window hole 15 from an inner peripheral edge of the annular holder 13 having no leg piece 23. The blade piece 26 is composed of a cover portion 26a, which extends to the central axis side by way of an upright portion 26c rising from the inner peripheral edge of the holder 13 slightly toward the opposite-to-flywheel side and covers the window hole 15, and a scooping portion 26b which bends and extends to the window hole 15 side from an edge at rear side in respect of rotation direction R of the cover portion 26a. Accordingly, when the clutch rotates in the direction of arrow R of FIG. 2, the blade piece 26 is adapted to positively force air outside of clutch in the direction of arrow A into the window hole 15.

A short cylindrical stopper 27 extends integrally from an outer peripheral edge of the annular holder 13 to the diaphragm spring 11 side, and a slight clearance L3 is provided in between a tip end of the stopper 27 and the In a case such as when the clutch is transported or stored for a long period under a condition whereby the clutch cover assembly is removed in the flywheel 1 and the clutch disc 2 as in the state of FIG. 1, the stopper 27 contacts with the outer peripheral annular portion 12 during the deformation of the diaphragm spring 11 from a free state thereof so as to prevent the pressure plate 7 from swinging, thereby resulting in a clearance L3. to such an extent that the outer peripheral annular portion 27 has made contact with the stopper 27 to positively separate the pressure plate 7 from the facing 5 when the clutch is disengaged under the state of FIG. 1.

During operation of the clutch assembly 6 after being assembled in an automobile etc., the annular holder 13 secured integrally to the pressure plate 7 by the rivet 24 contacts directly with air outside the clutch to come in touch with that part of air at a high relative speed based on the clutch rotation and the blade piece 26 is also integral with the holder 13 so that they both function as a cooling fin. Consequently, a heat of the pressure plate can be released positively from an external surface of the clutch. Further, the leg piece 23 passes through the window hole 15 so that it functions as a stopper member for the diaphragm spring 11 to keep the diaphragm spring 11 at its correct position and at the same time no sliding occurs at pressing parts between the diaphragm spring 11 and the wire ring 10 and the fulcrum projection 14. Moreover, when the clutch with no flywheel and clutch disc is transported or stored, the stopper 27 contacts the outer peripheral annular portion 12 to limit a movement of the pressure plate 7 toward the flywheel 1.

EFFECT OF THE INVENTION

As described above, the annular holder 13 and the blade piece 26 integral with the holder 13 are integrated with the pressure plate 7 through the leg piece 23 and contact directly with air outside the clutch; so that the high relative velocity in relation to the outside air can be obtained during rotation of the clutch, the heat of pressure plate 7 can be released positively to the outside air, thus the cooling effect of the pressure plate 7 and the facing 5 can be improved. Further, since the leg piece 23 connects the holder 13 to the pressure plate 7 through the window hole 15 which becomes disused for the pull-type clutch, it serves as a locking mechanism of the diaphragm spring 11 to eliminate the necessity of the single-purpose locking mechanism so that the whole structure can be simplified. Moreover, since the blade piece 26 is provided on the window hole through which no leg piece 23 passes, the air outside the clutch can be positively forced into the clutch through the window hole 15 to overcome disadvantages such as deformation of a friction surface of the pressure plate 7 and burn-out of the facing 5 even under a severe operating condition such as frequently repeated engagement/disengagement operation of clutch. Furthermore, since the stopper 27 is integrally provided on the outer peripheral edge of the annular holder 13, deformation and damage of the strap plate 18 caused by the swinging of the pressure plate can be surely avoided when the unit of the clutch cover assembly 6 having no clutch disc 2 before assembled to the flywheel 1 is transported or stored. By setting the clearance L3 considerably small, the pressure plate 7 can be positively separated from the facing 5 through the leg piece 23 at the time of releasing operation where the release lever 17 is pulled in the direction of arrow p2, so that the creep phenomenon can surely be prevented.

While the invention has been particularly shown and described in reference to preferred embodiments thereof, it will be understood by those skilled in the art that changes in form and details may be made therein without departing from the spirit and scope of the invention.

What is claimed is:

1. A cooling mechanism of a pull-type clutch having a clutch cover fastened to a flywheel, a diaphragm spring with an outer peripheral portion of which is supported to a flywheel side of an inner peripheral portion of the clutch cover through a wire ring, a pressure plate supporting a flywheel side inner peripheral edge of an outer peripheral annular portion of the diaphragm spring, a strap plate connecting the pressure plate with the clutch cover, and a clutch disc an outer peripheral facing of which is disposed between the pressure plate and the flywheel, the clutch disc being released by pulling in an opposite-to-flywheel-direction tip ends of release levers positioned between slits extending to a central axis side from plural window holes arranged at an internal side of said outer peripheral annular portion said cooling mechanism of the pull-type clutch, comprising an annular holder which covers an opposite-to-flywheel side of said outer peripheral annular portion; a leg piece which extends from a holder inner peripheral edge through a part of said window holes to the flywheel side to be secured to the pressure plate; a blade piece which extends from the holder inner peripheral edge to the remaining part of the window holes to force air into the window holes during rotation; and a stopper which extends from an outer peripheral edge of said holder toward the diaphragm spring in order to restrict the movement of the pressure plate toward the flywheel.

2. A cooling mechanism of a pull-type clutch as set forth in claim 1, in which the blade piece comprises a cover portion extending to a central axis side by way of an upright portion rising from an inner peripheral edge of the holder slightly toward a side opposite to the flywheel and covering the window hole, and a scooping portion bending and extending to the window hole side from an edge at a rear side in respect of rotation direction of the cover portion.

3. A cooling mechanism of a pull-type clutch as set forth in claim 1, wherein the wire ring fits in a stepped part of an inner peripheral portion of the clutch cover.

4. A cooling mechanism of a pull-type clutch as set forth in claim 1, wherein the strap plate extends in an peripheral direction of the clutch cover assembly to be connected by a rivet to an outer peripheral portion of the clutch cover at its one end and by a rivet to an outer peripheral projection of the pressure plate at its other end.

5. A cooling mechanism of a pull-type clutch as set forth in claim 1, wherein the annular holder, the strip leg piece and the blade piece are formed as an integral construction.

* * * * *